United States Patent [19]

Sharaby

[11] Patent Number: 5,077,096

[45] Date of Patent: Dec. 31, 1991

[54] NON-TOXIC CORROSION INHIBITIVE POLYMERS COMPOSITION AND METHOD THEREFOR

[75] Inventor: Ahmed Sharaby, Canyon Country, Calif.

[73] Assignee: Products Research & Chemical Corp., Woodland Hills, Calif.

[21] Appl. No.: 424,938

[22] Filed: Oct. 23, 1989

[51] Int. Cl.$^5$ ............................ C08K 3/32; B05D 3/02
[52] U.S. Cl. ............................. 427/388.2; 252/389.2; 252/389.23; 252/389.24; 427/385.5; 524/415; 524/416
[58] Field of Search .............................. 524/415, 416; 427/385.5, 388.1, 388.2; 252/389.23, 389.2, 389.24; 106/14.12

[56] References Cited

U.S. PATENT DOCUMENTS

| | | | |
|---|---|---|---|
| 3,293,189 | 12/1966 | Morgenthaler | 252/389.24 |
| 3,423,343 | 1/1969 | Barnett | 524/140 |
| 3,450,658 | 6/1969 | Morison | 524/416 |
| 3,493,440 | 2/1970 | Ashdown | 106/14.12 |
| 3,795,637 | 3/1974 | Kandler et al. | 524/416 |
| 3,923,748 | 12/1975 | Hutt et al. | 528/49 |
| 4,366,307 | 12/1982 | Singh et al. | 524/373 |
| 4,609,762 | 9/1986 | Morris et al. | 528/373 |
| 4,623,711 | 11/1986 | Morris et al. | 528/374 |
| 4,803,007 | 2/1989 | Garber | 252/389.2 |

FOREIGN PATENT DOCUMENTS 852226 10/1960 United Kingdom .

Primary Examiner—Veronica P. Hoke
Attorney, Agent, or Firm—Poms, Smith, Lande & Rose

[57] ABSTRACT

A corrosion inhibiting coating composition for metals comprising a liquid polymer composition which contains a polymer which is capable of being cured to a solid elastomer such as polysulfide, polyurethane, polythioether or polyether and a water soluble ammonium salt of phosphoric acid, orthophosphorous acid or hypophosphorous acid.

24 Claims, No Drawings

NON-TOXIC CORROSION INHIBITIVE POLYMERS COMPOSITION AND METHOD THEREFOR

BACKGROUND OF THE INVENTION

The present invention relates to a composition and method for inhibiting the corrosion of metal parts by aqueous salt solutions present in the environment (e.g. aqueous NaCl solutions). The method includes coating said metal parts with a corrosion inhibitive liquid polymer composition and curing same to a solid elastomer. The non-toxic corrosion inhibitive polymer composition includes a liquid polysulfide, polyurethane, polythioether or polyether having incorporated therein a metal corrosion inhibitive effective amount of at least one ammonium salt of ortho- or hypophosphorous acid or phosphoric acid (ortho-, meta- or hypophosphoric acid).

The present invention is particularly well suited for inhibiting the corrosion of at least two metal parts which have a joint or space therebetween formed by the opposed mating surfaces of said metal parts which are secured together. In an attempt to prevent the corrosion of metal parts, the joint or space formed by the interface between the metal parts (particularly aluminum and/or aluminum alloy) is oftentimes filled with a liquid polymer cured to an elastomeric solid which helps to prevent aqueous salt solutions, as well as oxygen, from coming into contact with the mating surfaces of the parts which are joined. The problem of corrosion of aluminum containing metal parts (including aluminum alloys) is even worse in the case of aircraft and ships since the metal parts making up the aircraft and/or ship are oftentimes made of a number of metals including aluminum and/or aluminum alloys. When dissimilar metals are joined, corrosion is a serious problem when the space or joint formed by the interface between the mating surfaces of the parts is exposed to aqueous salt solutions. This is particularly true when aluminum (including aluminum alloys) is joined or secured to a dissimilar metal. For example, in the case of aircraft, aluminum and/or aluminum alloy panels are often secured together with cadmium, nickel, stainless steel or titanium rivets which cause severe corrosion problems when the spaces or joints between such rivets and panels are exposed to aqueous salt solutions particularly in the presence of oxygen. The same is equally true of ships which have aluminum superstructures joined to steel hulls.

In the past, exclusion of aqueous salt solutions, electrical insulation and sacrificial anodes between dissimilar metals have been the primary means employed to control corrosion of the metal parts. The large stresses and movements of the structures of both aircraft and ships have made the use of elastomeric sealants the preferred material to both exclude aqueous salt solutions and accommodate structural movements. In practice, however, many interfaces of metal structures sealed with elastomers become permanently contaminated with aqueous salt solutions which seriously attack and weaken structural components. In addressing this problem, U.S. Pat. No. 3,841,896 added to polysulfide elastomers water soluble alkaline earth chromates. Such chromates were very beneficial in producing corrosion inhibitive elastomeric polysulfides but the use of chromates has been severely restricted because of toxicity and disposal problems. Therefore it is desideratum in the art to produce corrosion inhibitive elastomeric polymers which are corrosion inhibitive but do not contain chromates or other toxic compounds.

Although, as noted, soluble chromates have been found beneficial, I have also found that they offer very limited protection in preventing aluminum alloy attack, particularly when coupled with dissimilar metals such as carbon fiber reinforced panels or titanium metal which is a common metal used as a fastener in the aircraft industry.

SUMMARY OF THE INVENTION

The present composition and methods are predicated upon the surprising discovery that when a liquid polymer curable to a solid elastomer has incorporated therein one or more of the ammonium salts of (ortho or hypophosphorous acid) or phosphoric acid (ortho -, pyro- or hypophosphoric acid) the resulting composition offers excellent protection against corrosion attack when coated on metal parts. They are particularly effective against crevice corrosion attack of aluminum (including aluminum alloys) secured to or in close proximity to other metals such as cadmium, titanium and stainless steel.

The method of the present invention is particularly useful in preventing corrosion attack of aluminum metals by applying said composition to the surface of th metal and it is even more useful in protecting the interface of aluminum and dissimilar metals joined together by filling the space between the interface with the liquid polymer composition of the present invention to form an elastomeric sealant between the surfaces of the two dissimilar metal parts.

The foregoing is particularly surprising in view of the fact that U.S. Pat. No. 4,212,793 discloses that various alkaline salts of phosphoric acid and phosphorous acids, when added to a poly (arylene sulfide) resin prevents corrosion to the mold used in molding the resin, said corrosion being due to contact of the mold with sulfur dioxide. We have found that the water soluble salts mentioned in this patent (sodium hypophosphite and sodium triorthophosphate) do not have any significant effect when incorporated into elastomers, in preventing corrosion of metals such as aluminum and/or aluminum alloys due to exposure to aqueous salt solutions.

Ammonium salts that have been found to be particularly effective when incorporated into liquid polymers curable to elastomeric solids in corrosive inhibitive effective amounts are the ammonium salts of orthophosphoric acid and hypophosphorous acid. The preferred ammonium salts are ammonium hypophosphite and ammonium dihydrogen phosphate, including mixtures thereof. It is presently believed that incorporation of these ammonium salts in a liquid polymer which, when cured to an elastomeric solid when in contact with the metal part or parts, will alleviate pitting and corrosion, particularly crevice corrosion, on such metal parts. The present invention is very useful in preventing such pitting and corrosion of aluminum (including aluminum alloys) surfaces, even when such surfaces are secured or coupled together by a fastener such as a rivet made of a dissimilar metal such as titanium.

The presently preferred liquid polymers are polysulfides, polyurethanes, polythioethers, and polyethers and particularly preferred liquid polymers are those which are mercaptan terminated.

The present invention is particularly beneficial in those elastomeric mercaptan terminated polymers which are cured by using an alkaline oxidation catalyst. As is known in the art, most mercaptan terminated polymers are cured with an oxidation catalyst which is alkaline, either per se or by the addition of an alkaline material such as sodium hydroxide. In order to affect a cure of mercaptan terminated polymers using most oxidation catalysts the cure must be effected in an alkaline environment, i.e. the pH must be greater than 7.

Oxidation catalysts useful in curing the mercaptan terminated polymers of the present invention include organic and inorganic peroxides (e.g. calcium peroxide) and oxides such as manganese dioxide. In the case of manganese dioxide, a slight amount (from 0.5 to 3 weight percent) of sodium hydroxide is added in order to make the catalyst effective. It is particularly surprising that the ammonium salts of the present invention achieve such excellent results because it would be expected that the sodium hydroxide present in the manganese dioxide catalyst would convert the ammonium salts to the corresponding sodium salts, which, as noted above, have been shown to be relatively ineffective in reducing corrosion of metal parts when exposed to aqueous salt solutions.

DESCRIPTION OF THE PREFERRED EMBODIMENTS

The addition of the ammonium salts of the present invention to a liquid polymer curable to an elastomeric solid is believed to provide corrosion resistance to metal parts coated or sealed with such liquid polymer compositions. More specifically, the addition of the ammonium salts of the present invention to said liquid polymers eliminates the pitting and erratic dissolution of aluminum or aluminum alloy parts coupled with cadmium plated steel, stainless steel or titanium fasteners, when such parts and fasteners are coated and/or sealed with the liquid polymer compositions of the present invention and such compositions are cured to a solid elastomer.

As noted hereinbefore, the particularly preferred polymers are polysulfides, polyethers, polythioethers and polyurethanes, particularly those which are mercaptan terminated and cured with an alkaline oxidation catalyst such as manganese dioxide, calcium peroxide, etc.

By "polysulfides" we mean polymers having disulfide linkages, a number of which are commercially available under the name Thiokol polysulfides, such as those disclosed in U.S. Pat. No. 2,466,963. Other polysulfide polymers useful in the present invention are disclosed in U.S. Pat. Nos. 4,623,711 and 4,609,762. Both of these patents also disclose mercaptan terminated polysulfides. Polyurethane polymers useful in the present invention are well known in the art and are specifically disclosed in U.S. Pat. No. 3,923,748 which also discloses mercaptan terminated polyurethanes.

Similarly, polythioether polymers are also well known in the art and are, for example, disclosed in U.S. Pat. No. 4,366,307. Mercaptan terminated polythioethers are also disclosed in this patent.

Polyethers useful in the present invention are also well known and are, for example, disclosed in U.S. Pat. No. 4,366,307, which also discloses mercaptan terminated polyethers.

The amount of ammonium salts to be added to the elastomeric polymers of the present invention may vary. For example, in general the amount of ammonium salts added to the elastomeric polymer is between about weight % and about 20 weight %, (based on the weight of the liquid polymer), with the preferred amounts being between about 3 weight % and about 14 weight %.

Insofar as corrosion resistance is concerned, a number of methods have been used to measure this phenomenon against metals. One of the commonest used in the coatings industry involves the use of an aerated salt spray wherein coated, scribed panels are exposed to the environment for long periods and examined for corrosion, undercutting, blistering, etc. This test may not be representative of many critical conditions found in metal structures. We have devised a test which simulates a joint between the surfaces of two dissimilar materials and allows the entrance of the environment, permanently, into the interface, under conditions not unlike those experienced by structures in marine environments where collection of salt and water in joints is essentially irreversible. The driving potential of the coupled metals is also an important factor in increasing the corrosive attack by chemically reducing oxygen and water to form sodium hydroxide in close proximity to the aluminum surface rather than being washed away in salt spray. The nature of the observed corrosion parallels closely that found in the filed. The specific test used by us is as follows:

Two inch by five inch panels of untreated aluminum alloy, 7075-ST-6 are coated with five 0.02"×½"/2" strips of sealant, each strip separated from the adjacent strip by a ¼" band of an uncoated section of the aluminum. A candidate test metal (i.e. cadmium plated steel) of similar dimensions to the aluminum panel is pressed against the sealant coated side of the aluminum and held together by adhesive or masking tape on the ends leaving the 5" sides exposed. (Panels are coated on the back side with an insulating film where electrical measurements are to be made.) This sandwich type assembly is one half immersed in a trough of 3% salt water, edgewise, along its 5" length.

The trough is open to the atmosphere but loosely covered to limit water evaporation. To encourage galvanic corrosion, the metal couples are connected with alligator clips to induce corrosive current flow between the dissimilar metals. Salt water and oxygen diffuse into the cavities introduced by the 20 mil thick sealant into the ¼" spacings. The shorted circuits may be opened at intervals to measure voltage and current flows with sensitive voltammeters or a Wheatstone bridge and finally examined for corrosion and undercutting of sealant on the inside surfaces of the cell sandwich.

In order to test various salts as inhibitor the following elastomeric sealant was used wherein the Polysulfide Polymer is manufactured and sold as Thiokol LP-32 by Morton Thiokol Chemical Corporation, Chicago, Ill. LP-32 has the formula $HS(RSS)_nRSH$ wherein R is $-C_2H_4-O-CH_2-O-C_2H_4-$ and the value of n is such that the molecular weight is 4,000.

| ELASTOMERIC SEALANT | |
|---|---|
| Compound | Parts By Weight |
| Polysulfide Polymer (LP-32) | 100 |
| Calcium Carbonate (filler) | 50 |
| Phenolic Adhesion Promoter (2,4-diallyl phenol) | 3 |

-continued

| ELASTOMERIC SEALANT | |
|---|---|
| Compound | Parts By Weight |
| Salt Inhibitor | Variable |

To the above sealant composition was added 7 parts by weight of Manganese Dioxide catalyst having about 1 weight percent of sodium hydroxide, the catalyst being dispersed in eight parts by weight of hydrogenated terphenyl (Monsanto HB-40).

TABLE COMPARING ANTI-CORROSIVE BEHAVIOR OF POTENTIAL INHIBITORS In a Polysulfide Base Using an Aluminum-Cadmium Couple

| Inhibitor | Time Immersed | Weight % Inhibitor | Results |
|---|---|---|---|
| None | 3 days | — | Severe pitting of aluminum |
| None | 21 days | — | Severe pitting. Heavy corrosion products between sealant strips and under sealant. Adhesion loss. Steel rusting under cadmium plate. |
| Calcium molybdate | 7 days | 5 | Severe pitting and corrosion of aluminum. Loss of adhesion. |
| Sodium molybdate | 7 days | 5 | Extremely severe corrosion of aluminum. |
| Magnesium chromate | 21 days | 5 | Aluminum alloy and cadmium shiny, unchanged. |
| Ammonium hypophosphite | 21 days | 3 | Cadmium and aluminum alloy shiny. |
| Ammonium dihydrogen phosphate | 21 days | 3 | Metals unchanged. |
| Sodium Hypo phosphite | 7 days | 5 | Severe pitting and corrosion of aluminum |
| Sodium phosphate | 3 days | 5 | Extremely severe attack of aluminum |
| Ammonium hypophosphite + ammonium dihydrogen phosphate | 42 days | 4 | Appearance unchanged |
| Ammonium hypophosphite | 42 days | 14 | Some darkening and evidence of corrosion |

In addition to the galvanic-crevice corrosion cells employing aluminum alloy-cadmium couple, several other metals were coupled with the same aluminum alloy coated with strips of inhibited and uninhibited Thiokol polysulfide sealant with the following results:

TABLE SHOWING EFFECT OF VARIOUS INHIBITORS IN A POLYSULFIDE BASE ON CORROSION OF ALUMINUM ALLOY 70-75 ST COUPLED WITH VARIOUS AIRCRAFT CONSTRUCTION MATERIALS

| Inhibitor | Days/ Time | % Conc. | Couple | Visual Results |
|---|---|---|---|---|
| None | 7 | — | Al—Ti | Severe destruction of aluminum sealant. |
| None | 7 | | Al—C | Blistered. Very Severe destruction of aluminum. Adhesion loss. |
| None | 7 | | Al-stainless | Worse attack than with titanium - Sealant largely destroyed |
| $MgCrO_4$ | 21 | 5 | Al—Ti | Aluminum attack but less than without inhibitor |
| $MgCrO_4$ | 21 | 5% | Al-stainless steel | Little or no improvement over no inhibitor |
| $MgCrO_4$ | 7 | 5 | Al-carbon | No benefit over no inhibitor. Very severe aluminum loss |
| $NH_4H_2PO_2$ | 21 | 3 | Al—Ti | No change. Metals still shiny Sealant retains adhesion |
| $NH_4H_2PO_2$ | 21 | 3 | Al-stainless steel | Slight darkening of aluminum Adhesion OK |
| $NH_4H_2PO_2$ | 7 | 7 | Al-carbon | Mild corrosion of metal |
| $NH_4H_2PO_2$ | 21 | 3 | Al—Ti | Very slight discoloration visible. |
| $NH_4H_2PO_2$ | +21 | 1½ | Al-stainless steel | No change. Metals shiny. |
| $NH_4H_2PO_2$ | | 1½ | | |

While the aluminum usually shows no visual localized attack, in order to have a more quantitive evaluation of overall metal corrosion, the corrosion cells were opened at intervals and the current flow measured with a high impedance meter with the following results:

TABLE GIVING OBSERVED CURRENT FLOWS OF ALUMINUM-CADMIUM AND ALUMINUM-TITANIUM CELLS WITH TIME USING DIFFERENT INHIBITORS VERSUS NO INHIBITOR CURRENT IN MICRO AMPS

| Time | No Inhibitor | Magnesium Chromate | Ammonium dihydrogen phosphate + Ammonium Hypophosphite |
|---|---|---|---|
| Al—Cd couple | | | |
| Initial 1 day | 11 | 13.0 | 3.2 |
| Average 21 days | 14 | 7.94 | 3.82 |
| Final (21 days) | 25 | 6.1 | 3.2 |
| Al—Ti | | | |
| 1 day | 55 | 45.0 | 26.0 |
| Average 21 days | 65 | 33.3 | 24.0 |
| Final (21 days) | 75 | 29.0 | 25.0 |

The amount of magnesium chromate was 5 wt. % and the amount of the mixture is 5 wt. %, said mixture containing equal amounts of ammonium dihydrogen phosphate and ammonium hyposphosphite.

CORROSION PROTECTION OF VARIOUS SEALANTS CONTAINING AMMONIUM HYPOPHOSPHITE

The benefits in corrosion resistance of the present invention are found in other polymers (utilizing the basic Elastomeric Sealant formula) using ammonium hypophosphite as the inhibitor.

| Polymer | Curing Agent | Inhibitor Parts By Wt. | Time Results |
|---|---|---|---|
| Mercaptan terminated polyurethane* | Manganese dioxide | 5 | 28 days-No observable corrosion. Metal shiny. |
| Thiokol LP-32 | Magnesium dichromate | 5 | 28 days-No observable corrosion. Metal shiny. |
| Mercaptan terminated polythioether** | Manganese Dioxide | 5 | 28 days-No observable corrosion. Metal shiny. |

*The polymer of Example IV of U.S. Pat. No. 3,923,748.
**The polymer of Example 13 of U.S. Pat. No. 4,366,307.

I claim:

1. A liquid polymer composition curable to a solid elastomer which, when applied to metals, inhibits the corrosion of such metals when exposed to aqueous salt solutions, said composition consisting essentially of a liquid polymer selected from the group consisting of polysulfide, polyurethane, polythioether, and polyether, said liquid polymer having incorporated therein a corrosion inhibitive effective amount of at least one water soluble ammonium salt of phosphoric acid or ortho- or hypophosphorous acid.

2. A liquid polymer composition according to claim 1 wherein said ammonium salt is selected from the group consisting of ammonium orthophosphate and ammonium phosphite.

3. A liquid polymer composition according to claim 2 wherein said ammonium salt is dihydrogen phosphate.

4. A liquid polymer composition according to claim 2 wherein said ammonium salt is ammonium hypophosphite.

5. A liquid polymer composition according to claim 1 wherein said liquid polymer is mercaptan terminated.

6. A liquid polymer composition according to claim 5 wherein said composition contains a curing effective amount of an alkaline oxidation catalyst.

7. A liquid polymer composition according to claim 6 wherein said alkaline oxidation catalyst is alkaline manganese dioxide.

8. A method for increasing the corrosion resistance of a metal to attack by an aqueous salt solution which comprises applying to said metal a liquid polymer composition curable to a solid elastomer, said liquid polymer composition consisting essentially of a liquid polymer selected from the group consisting of polysulfide, polyurethane, polythioether and polyether, said liquid polymer having incorporated therein
   (a) a corrosion inhibitive effective amount of at least one water soluble ammonium salt of phosphoric acid or ortho- or hypophosphorous acid and
   (b) a curing effective amount of a curing catalyst,
applying said liquid polymer composition to a metal and
curing said liquid polymer composition to a solid elastomer.

9. A method according to claim 8 wherein said metal is aluminum.

10. A method according to claim 9 wherein said ammonium salt is selected from the group consisting of ammonium ortho phosphate and ammonium phosphite.

11. A method according to claim 10 wherein said ammonium salt is ammonium dihydrogen phosphate.

12. A method according to claim 10 wherein said ammonium salt is ammonium hypophosphite.

13. A method according to claim 9 wherein said liquid polymer is mercaptan terminated.

14. A method according to claim 13 wherein said curing catalyst is an alkaline oxidation catalyst.

15. A method according to claim 14 wherein said alkaline oxidation catalyst is manganese dioxide.

16. A method for inhibiting the corrosion of two metal parts which have a joint therebetween formed by the opposed mating surfaces of said metal parts which are joined together, and when said metal parts are exposed to an aqueous salt solution, said method comprising:
filling said joint with a liquid polymer composition curable to a solid sealant elastomer, said composition consisting essentially of a liquid polymer curable to a solid elastomeric sealant, said liquid polymer having incorporated therein
   (a) a corrosion inhibiting effective amount of at least one water soluble ammonium salt of phosphoric acid or ortho- or hypophosphorous acid and
   (b) a curing effective amount of a catalyst for curing said liquid polymer to a solid elastomeric sealant, and
curing said liquid polymer to a solid elastomeric sealant to form a seal at said joint interface of said two metal parts.

17. A method according to claim 16 wherein one of said metal parts is aluminum.

18. A method according to claim 17 wherein one of said metal parts is aluminum and which is joined together with a dissimilar metal.

19. A method according to claim 16 wherein said ammonium salt is selected from the group consisting of ammonium ortho phosphate and ammonium phosphite.

20. A method according to claim 19 wherein said ammonium salt is ammonium dihydrogen phosphate.

21. A method according to claim 19 wherein said ammonium salt is ammonium hypophosphite.

22. A method according to claim 16 wherein said polymer is selected from the group consisting of polysulfide, polyurethane, polythioether and polyether.

23. A method according to claim 22 wherein said liquid polymer is mercaptan terminated.

24. A method according to claim 23 wherein said curing catalyst is a alkaline oxidation catalyst.

* * * * *